United States Patent
Wu et al.

(10) Patent No.: US 12,021,380 B1
(45) Date of Patent: Jun. 25, 2024

(54) ELECTROLYTIC ALUMINUM SYSTEM BASED ON FLEXIBLE DC MICROGRID

(71) Applicant: SPIC Yunnan International Power Investment Co., Ltd., Kunming (CN)

(72) Inventors: Zhiquan Wu, Kunming (CN); Lin Zhu, Kunming (CN); Xin Zhang, Kunming (CN); Yingying Li, Kunming (CN); Chun Wu, Kunming (CN); Kerui Chen, Kunming (CN); Xiumei Chen, Kunming (CN); Zhuowei Bian, Kunming (CN)

(73) Assignee: SPIC Yunnan International Power Investment Co., Ltd., Kunming (CN)

( * ) Notice: Subject to any disclaimer, the term of this patent is extended or adjusted under 35 U.S.C. 154(b) by 0 days.

(21) Appl. No.: 18/593,567

(22) Filed: Mar. 1, 2024

(30) Foreign Application Priority Data

Mar. 23, 2023 (CN) .......................... 202310287878.7

(51) Int. Cl.
*H02J 13/00* (2006.01)
*H02J 1/00* (2006.01)

(52) U.S. Cl.
CPC .......... *H02J 13/00028* (2020.01); *H02J 1/00* (2013.01); *H02J 13/00001* (2020.01); *H02J 13/00002* (2020.01)

(58) Field of Classification Search
CPC .. H02J 13/00028; H02J 1/00; H02J 13/00001; H02J 13/00002
See application file for complete search history.

(56) References Cited

U.S. PATENT DOCUMENTS

2016/0254562 A1* 9/2016 Morris-Cohen ...... H01M 8/188
                                                           320/128

FOREIGN PATENT DOCUMENTS

| CN | 103103569 A | * | 5/2013 |
| CN | 103510124 A |   | 1/2014 |

(Continued)

OTHER PUBLICATIONS

First Office Action issued in counterpart Chinese Patent Application No. 202310287878.7, dated Apr. 27, 2023.

*Primary Examiner* — Kidest Bahta
(74) *Attorney, Agent, or Firm* — Westbridge IP LLC (57) ABSTRACT

Disclosed is an electrolytic aluminum system based on a flexible DC (Direct Current) microgrid, by using the current adjustment and cloud monitoring transmission technology for electrolytic aluminum temperature electrochemical reaction elements. The system transmits flexible DC microgrid running monitoring current adjustment and cloud monitoring, flexible DC microgrid monitoring current adjustment and cloud monitoring, engineer operation current adjustment and cloud monitoring, flexible DC microgrid electrolytic aluminum status current adjustment and cloud monitoring and high-precision electrolytic aluminum temperature optimization and cloud monitoring which are acquired by a flexible DC microgrid current adjustment and cloud monitoring management module to a current adjustment big data judgment and adjustment module through the electrolytic aluminum temperature electrochemical reaction elements, to be sent to a flexible DC microgrid current adjustment and alarming module through the electrolytic aluminum temperature electrochemical reaction elements, thus effectively improving the current adjustment level of the flexible DC microgrid.

5 Claims, 2 Drawing Sheets

(56) References Cited

FOREIGN PATENT DOCUMENTS

| | | | |
|---|---|---|---|
| CN | 104184210 | A | 12/2014 |
| CN | 105016428 | A | 11/2015 |
| CN | 207053181 | U | 2/2018 |
| CN | 109687579 | A | 4/2019 |
| CN | 110416991 | A | 11/2019 |
| CN | 113315229 | A | 8/2021 |
| CN | 114744607 | A * | 7/2022 |
| CN | 115094481 | A | 9/2022 |

* cited by examiner

ELECTROLYTIC ALUMINUM SYSTEM BASED ON FLEXIBLE DC MICROGRID

CROSS-REFERENCE TO RELATED APPLICATIONS

The application claims priority to Chinese Patent Application 202310287878.7, filed on Mar. 23, 2023, which is incorporated herein by reference in its entirety.

TECHNICAL FIELD

The present disclosure relates to the field of electrolytic aluminum, and in particular to an electrolytic aluminum system based on a flexible Direct Current (DC) microgrid.

BACKGROUND

The production for the electrolytic aluminum industry has expanded rapidly in recent years. As a high energy consumption industry and under the pressure from international competition and environmental protection, this industry urgently needs an effective optimizing way in aspects of capacity improvement, efficiency promotion, pollution discharge reduction and the like. With the gradual expansion of newly built projects, continuously improved power supply voltage grade and gradually increased power supply current, higher requirements are proposed to the safety production and efficient management of the electrolytic aluminum industry.

How to control the current and temperature is an issue to be considered in a process that the existing electrolytic aluminum system electrolytic aluminum, currently a chemical reaction occurs between a cathode and an anode through a high-intensity current in an electrolytic aluminum process, thus the aluminum in a raw material can form molten aluminum, and during this operation process, the magnitude of current will enable the raw material to accumulate, then the input of a reaction process is gradually invaded inside, thus increasing the equipment energy consumption, reducing the efficiency and increasing the cost; and moreover when an excessive moisture residual in the raw material enters an electrolyzing cavity, an air pressure generates, such that an internal air pressure will increase, which will affect the equipment safety.

SUMMARY

To overcome shortcomings and deficiencies existing in the prior art, the present disclosure provides an electrolytic aluminum system based on a flexible DC microgrid.

The present disclosure is implemented by the following technical solution.

An electrolytic aluminum system based on a flexible direct current microgrid, including a flexible DC microgrid current adjustment and cloud monitoring management module, different flexible DC microgrid electrochemical reaction theoretical analysis modules, a current adjustment big data judgment and adjustment module and a flexible DC microgrid current adjustment and alarming module, where the flexible DC microgrid current adjustment and cloud monitoring management module is configured to manage a flexible DC microgrid requiring current adjustment and control in real time and to monitor an electrolytic aluminum status and an electrolytic aluminum temperature of the flexible DC microgrid, the electrolytic aluminum status and the electrolytic aluminum temperature are organized into a current adjustment and cloud monitoring data set to be sent to the different flexible DC microgrid electrochemical reaction theoretical analysis modules; the different flexible DC microgrid electrochemical reaction theoretical analysis modules are provided with different electrolytic aluminum temperature electrochemical reaction elements, among which an attention mechanism algorithm is arranged, the current adjustment and cloud monitoring data set is transmitted to the electrolytic aluminum temperature electrochemical reaction elements and fed back through the attention mechanism algorithm, and then the current adjustment and cloud monitoring data set is sent to the current adjustment big data judgment and adjustment module through the electrolytic aluminum temperature electrochemical reaction elements; the current adjustment big data judgment and adjustment module is provided with a flexible DC microgrid information sheet, in which a flexible DC microgrid remote current adjustment and evaluation element is arranged, the current adjustment big data judgment and adjustment module performs electrochemical reaction theoretical analysis on the current adjustment and cloud monitoring data set and the flexible DC microgrid remote current adjustment and evaluation element, to obtain different types of flexible DC microgrid current adjustment and cloud monitoring, the flexible DC microgrid current adjustment and cloud monitoring are transmitted to the electrolytic aluminum temperature electrochemical reaction elements, fed back to the electrolytic aluminum temperature electrochemical reaction elements through the attention mechanism algorithm, and delivered to the flexible DC microgrid current adjustment and alarming module; and the flexible DC microgrid current adjustment and alarming module includes a flexible DC microgrid current adjustment system and a flexible DC microgrid channel which are configured to receive the flexible DC microgrid current adjustment and cloud monitoring and to display corresponding electrolytic aluminum temperature optimization and evaluation instructions according to the type of the flexible DC microgrid current adjustment and cloud monitoring, the electrolytic aluminum temperature optimization and evaluation instructions are transmitted to the electrolytic aluminum temperature electrochemical reaction elements through the flexible DC microgrid current adjustment and alarming module, fed back to the electrolytic aluminum temperature electrochemical reaction elements through the attention mechanism algorithm, transmitted to the real-time monitoring current adjustment and cloud monitoring associated to the taking of the flexible DC microgrid current adjustment and cloud monitoring management module, and completes the flexible DC microgrid current adjustment and cloud monitoring display through the flexible DC microgrid current adjustment system.

In this solution, the different flexible DC microgrid electrochemical reaction theoretical analysis modules composed of the different electrolytic aluminum temperature electrochemical reaction elements through the attention mechanism algorithm serve as current adjustment and cloud monitoring transmission links in a region with a poor network coverage by using the current adjustment and cloud monitoring transmission technology for the electrolytic aluminum temperature electrochemical reaction elements; the monitoring current adjustment and cloud monitoring, flexible DC microgrid monitoring current adjustment and cloud monitoring, engineer operation current adjustment and cloud monitoring, flexible DC microgrid electrolytic aluminum status current adjustment and cloud monitoring and high-precision electrolytic aluminum temperature optimization and cloud monitoring which are acquired by the flexible DC microgrid current adjustment and cloud monitoring management module are fed back to the current adjustment big data judgment and adjustment module along the attention mechanism algorithm through the electrolytic aluminum temperature electrochemical reaction elements; after performing the electrochemical reaction theoretical analysis, the flexible DC microgrid current adjustment and cloud monitoring generate and are sent to the flexible DC microgrid current adjustment and alarming module through the electrolytic aluminum temperature electrochemical reaction elements, thus implementing the flexible DC microgrid monitoring current adjustment and cloud monitoring transmission as well as the flexible DC microgrid current adjustment and cloud monitoring display, such that the flexible DC microgrid monitored by the flexible DC microgrid is not limited by the current adjustment and cloud monitoring transmission scope, thereby implementing the monitoring for the flexible DC microgrid by different flexible DC microgrids, effectively enhancing the timeliness and reliability that the flexible DC microgrid monitors the flexible DC microgrid, improving the monitoring scientific and technological level of the flexible DC microgrid, and improving the current adjustment level of the flexible DC microgrid.

Further, a flexible DC microgrid type judgment system is arranged in the current adjustment big data judgment and adjustment module and sets a corresponding model based on the flexible DC microgrid remote current adjustment and evaluation element of the flexible DC microgrid information sheet, the current adjustment big data judgment and adjustment module performs preliminary current adjustment on the current adjustment and cloud monitoring data set and performs the electrochemical reaction theoretical analysis, and the processed current adjustment and cloud monitoring are introduced into the preset model; and by adjusting the current and the model, the corresponding type of flexible DC microgrid current adjustment and cloud monitoring generate and are delivered to the flexible DC microgrid current adjustment and alarming module through the electrolytic aluminum temperature electrochemical reaction elements.

In this solution, the graded judgment for the flexible DC microgrid type is achieved by establishing the flexible DC microgrid type judgment system, the graded accuracy of the flexible DC microgrid type is improved based on the comparison of the flexible DC microgrid remote current adjustment and evaluation element, and alarm may be performed by the graded flexible DC microgrid, to reduce disaster economic losses and engineer casualties.

Further, the flexible DC microgrid current adjustment and cloud monitoring management module includes a flexible DC microgrid monitoring sensor, a flexible DC microgrid current adjustment and cloud monitoring collection module, a flexible DC microgrid module and an electrolytic aluminum temperature electrochemical reaction element current adjustment and cloud monitoring transmission module, different input ends of the flexible DC microgrid monitoring sensor convert the managed current adjustment and cloud monitoring into different electrical signals, different output ends of the flexible DC microgrid monitoring sensor are connected with the flexible DC microgrid current adjustment and cloud monitoring collection module that converts the electrical signals into a plurality of monitoring current adjustment and cloud monitoring, the flexible DC microgrid module collects the plurality of monitoring current adjustment and cloud monitoring and transmits the plurality of monitoring current adjustment and cloud monitoring to the electrolytic aluminum temperature electrochemical reaction element current adjustment and cloud monitoring transmission module that is in transmission interaction with bidirectional current adjustment and cloud monitoring of the electrolytic aluminum temperature electrochemical reaction elements, and transmits the plurality of collected monitoring current adjustment and cloud monitoring to the electrolytic aluminum temperature electrochemical reaction elements.

Preferably, the current adjustment big data judgment and adjustment module, the flexible DC microgrid current adjustment and alarming module and the flexible DC microgrid current adjustment and cloud monitoring management module are in transmission interaction with the bidirectional current adjustment and cloud monitoring of the electrolytic aluminum temperature electrochemical reaction elements in respective, where the current adjustment big data judgment and adjustment module is further configured to receive the electrolytic aluminum temperature optimization and evaluation instructions of the flexible DC microgrid current adjustment and alarming module and sends the electrolytic aluminum temperature optimization and evaluation instructions to the flexible DC microgrid current adjustment and cloud monitoring management module to acquire specific monitoring current adjustment and cloud monitoring; due to an issue of selective management current adjustment and cloud monitoring caused by a great current adjustment and cloud monitoring quantity in a transmission process of the current adjustment and cloud monitoring, a zone prone to the flexible DC microgrid is subjected to detailed electrochemical reaction theoretical analysis in advance in an area and a time period prone to the flexible DC microgrid by actively acquiring a great amount of monitoring current adjustment and cloud monitoring managed by the flexible DC microgrid current adjustment and cloud monitoring management module.

Based on the foregoing system, the present disclosure further provides an electrolytic aluminum system based on a flexible DC microgrid, and the remote current adjustment for the system includes the following steps:

the flexible DC microgrid current adjustment and cloud monitoring management module acquires the flexible DC microgrid for current adjustment and control required by real-time management, monitors the electrolytic aluminum status and the electrolytic aluminum temperature of the flexible DC microgrid, and organizes the electrolytic aluminum status and the electrolytic aluminum temperature into the current adjustment and cloud monitoring data set to be sent to the electrolytic aluminum temperature electrochemical reaction elements;

the electrolytic aluminum temperature electrochemical reaction elements feed back the current adjustment and cloud monitoring data set through the attention mechanism algorithm, and send the current adjustment and cloud monitoring data set to the current adjustment big data judgment and adjustment module;

after performing the electrochemical reaction theoretical analysis, the current adjustment big data judgment and adjustment module generates the flexible DC microgrid current adjustment and cloud monitoring which are sent to the electrolytic aluminum temperature electrochemical reaction elements;

the flexible DC microgrid type judgment system and the flexible DC microgrid information sheet are established in the current adjustment big data judgment and adjustment module;

the flexible DC microgrid remote current adjustment and evaluation element is stored in the flexible DC microgrid information sheet, the corresponding models are set in the flexible DC microgrid type judgment system, and the models correspond to different types of flexible DC microgrid remote current adjustment and evaluation elements;

the current adjustment big data judgment and adjustment module introduces the current adjustment and cloud monitoring data set for preliminary current adjustment and electrochemical reaction theoretical analysis, and the processed current adjustment and cloud monitoring are introduced into the preset model; and by adjusting the current and the model and judging whether or not the current is abnormal, the corresponding type of flexible DC microgrid current adjustment and cloud monitoring are delivered to the flexible DC microgrid current adjustment and alarming module through the electrolytic aluminum temperature electrochemical reaction elements when the current is abnormal;

the electrolytic aluminum temperature electrochemical reaction elements feed back the flexible DC microgrid current adjustment and cloud monitoring through the attention mechanism algorithm, and send the flexible DC microgrid current adjustment and cloud monitoring to the flexible DC microgrid current adjustment and alarming module;

the flexible DC microgrid current adjustment and cloud monitoring display are completed in the flexible DC microgrid current adjustment and alarming module through the flexible DC microgrid current adjustment system and the flexible DC microgrid channel; and the flexible DC microgrid current adjustment and alarming module displays the electrolytic aluminum temperature optimization and evaluation instructions according to the flexible DC microgrid current adjustment and cloud monitoring situation, and sends the real-time monitoring current adjustment and cloud monitoring associated to the taking of the flexible DC microgrid current adjustment and cloud monitoring management module through the electrolytic aluminum temperature electrochemical reaction elements.

Compared with the prior art, the present disclosure has the following advantages.

The present disclosure provides an electrolytic aluminum system based on a flexible DC microgrid, the flexible DC microgrid running monitoring current adjustment and cloud monitoring, flexible DC microgrid monitoring current adjustment and cloud monitoring, engineer operation current adjustment and cloud monitoring, flexible DC microgrid electrolytic aluminum status current adjustment and cloud monitoring and high-precision electrolytic aluminum temperature optimization and cloud monitoring which are acquired by the flexible DC microgrid current adjustment and cloud monitoring management module are transmitted to the current adjustment big data judgment and adjustment module through the electrolytic aluminum temperature electrochemical reaction elements; after performing the electrochemical reaction theoretical analysis, the flexible DC microgrid current adjustment and cloud monitoring generate and are sent to the flexible DC microgrid current adjustment and alarming module through the electrolytic aluminum temperature electrochemical reaction elements, thus implementing the flexible DC microgrid monitoring current adjustment and cloud monitoring transmission as well as the flexible DC microgrid current adjustment and cloud monitoring display, such that the flexible DC microgrid monitored by the flexible DC microgrid is not limited by the current adjustment and cloud monitoring transmission scope, thereby implementing the monitoring for the flexible DC microgrid by different flexible DC microgrids, effectively enhancing the timeliness and reliability that the flexible DC microgrid monitors the flexible DC microgrid, improving the monitoring scientific and technological level of the flexible DC microgrid, and improving the current adjustment level of the flexible DC microgrid.

BRIEF DESCRIPTION OF THE DRAWINGS

The drawings illustrated herein are used for providing a further understanding of embodiments of the present invention, and constitute a part of this application, but do not constitute limitations to the embodiments of the present invention.

DETAILED DESCRIPTION OF THE EMBODIMENTS

In order to enable the purpose, the technical solution and the advantage of the present disclosure to be more clear, the present disclosure is further described in detail below in combination with the embodiments and the drawings. The exemplary implementations of the present disclosure and the description thereof are used for explaining the present disclosure, but do not constitute limitations to the present disclosure.

Numerous specific details are described in the following description in order to facilitate a thorough understanding of the present disclosure. However, it is apparent that an ordinary technical engineer in the art does not adopt these specific details to implement the present disclosure. In other examples, the known structure, circuit, material or method is not specifically described to avoid confusing the present disclosure.

In the whole specification, the reference to "one embodiment", "embodiments", "one example" or "examples" means that the specific remote current adjustment and evaluation, structure or characteristic described in combination with this embodiment or example are included in at least one embodiment of the present disclosure.

Therefore, expressions "one embodiment", "embodiments", "one example" or "examples" in various parts of the whole specification do not necessarily refer to the same embodiment or example. In addition, the specific remote current adjustment and evaluation, structure or characteristic may be combined in one or different embodiments or examples in any appropriate combination and/or sub-combination. Furthermore, an ordinary technical engineer in the art should understand that the diagram provided herein is only for the purpose of description, and is not necessarily drawn based on a proportion. Terms "and/or" used herein for remote current adjustment include any or all combinations of one or different associated list items.

In the description of the present disclosure, it is understood that orientations or electrolytic aluminum temperature optimization relationships indicated by the terms "front", "rear", "left", "right", "upper", "lower", "vertical", "horizontal", "top", "bottom", "inner", "outer" and the like are based on the orientations or electrolytic aluminum temperature optimization relationships as shown in the drawings, for ease of describing the present disclosure and simplifying the description only, rather than indicating or implying that the mentioned apparatus or element necessarily has a particular orientation and must be constructed and operated in the particular orientation. Therefore, these terms should not be understood as limitations to the scope of protection of the present disclosure.

Figure 1:
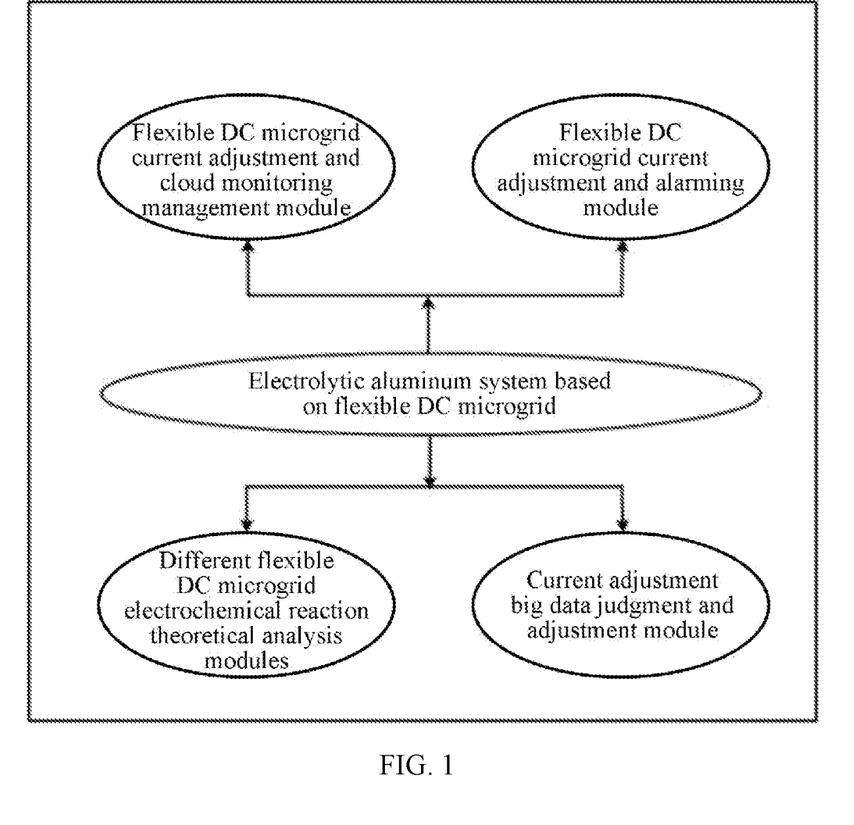
FIG. 1 is a module function diagram of an electrolytic aluminum system based on a flexible DC microgrid in embodiments of the present disclosure.

As shown in FIG. 1, the present disclosure provides an electrolytic aluminum system based on a flexible DC microgrid, including a flexible DC microgrid current adjustment and cloud monitoring management module configured to manage a flexible DC microgrid requiring current adjustment and control in real time and to monitor an electrolytic aluminum status and an electrolytic aluminum temperature of the flexible DC microgrid, where the electrolytic aluminum status and the electrolytic aluminum temperature are organized into a current adjustment and cloud monitoring data set to be sent to different flexible DC microgrid electrochemical reaction theoretical analysis modules;

the different flexible DC microgrid electrochemical reaction theoretical analysis modules provided with different electrolytic aluminum temperature electrochemical reaction elements, among which an attention mechanism algorithm is arranged, where the current adjustment and cloud monitoring data set is transmitted to the electrolytic aluminum temperature electrochemical reaction elements and fed back through the attention mechanism algorithm, and then the current adjustment and cloud monitoring data set is sent to a current adjustment big data judgment and adjustment module through the electrolytic aluminum temperature electrochemical reaction elements;

the current adjustment big data judgment and adjustment module provided with a flexible DC microgrid information sheet, in which a flexible DC microgrid remote current adjustment and evaluation element is arranged, where the current adjustment big data judgment and adjustment module performs comparison on the current adjustment and cloud monitoring data set and the cloud monitoring and flexible DC microgrid remote current adjustment and evaluation element and performs the electrochemical reaction theoretical analysis to obtain different types of flexible DC microgrid current adjustment and cloud monitoring, the flexible DC microgrid current adjustment and cloud monitoring are transmitted to the electrolytic aluminum temperature electrochemical reaction elements, fed back to the electrolytic aluminum temperature electrochemical reaction elements through the attention mechanism algorithm, and delivered to a flexible DC microgrid current adjustment and alarming module; and the flexible DC microgrid current adjustment and alarming module including a flexible DC microgrid current adjustment system and a flexible DC microgrid channel which are configured to receive the flexible DC microgrid current adjustment and cloud monitoring and to display corresponding electrolytic aluminum temperature optimization and evaluation instructions according to the type of the flexible DC microgrid current adjustment and cloud monitoring, where the electrolytic aluminum temperature optimization and evaluation instructions are transmitted to the electrolytic aluminum temperature electrochemical reaction elements through the flexible DC microgrid current adjustment and alarming module, fed back to the electrolytic aluminum temperature electrochemical reaction elements through the attention mechanism algorithm, transmitted to the real-time monitoring current adjustment and cloud monitoring associated to the taking of the flexible DC microgrid current adjustment and cloud monitoring management module through the electrolytic aluminum temperature electrochemical reaction elements, and completes the flexible DC microgrid current adjustment and cloud monitoring display through the flexible DC microgrid current adjustment system; and the current adjustment and cloud monitoring display are sent to the flexible DC microgrid current adjustment and alarming module through the electrolytic aluminum temperature electrochemical reaction elements, thus implementing the flexible DC microgrid monitoring current adjustment and cloud monitoring transmission as well as the flexible DC microgrid current adjustment and cloud monitoring display, such that the flexible DC microgrid monitored by the flexible DC microgrid is not limited by the current adjustment and cloud monitoring transmission scope, thereby implementing the monitoring for the flexible DC microgrid by different flexible DC microgrids, effectively enhancing the timeliness and reliability that the flexible DC microgrid monitors the flexible DC microgrid, improving the monitoring the scientific and technological level of the flexible DC microgrid, and improving the capacity of the flexible DC microgrid.

The attention mechanism algorithm is that different temperatures of electrochemical reactions are performed on the electrolytic aluminum temperature electrochemical reaction elements of the system, when the temperature changes quickly and more data generates, computing resources are allocated to higher-level tasks and at the same time an information overload issue is solved, an attention mechanism is introduced when more data is provided, the information that is more critical to the current task is focused in numerous input information, to reduce the attention to other information, even filter irrelevant information, and improve the task processing efficiency and accuracy; and the quality of the current adjustment and cloud monitoring data set may be fed back well through the attention mechanism, such that a better control effect can be achieved to a certain acquisition data size of the flexible DC microgrid current adjustment and cloud motioning, to avoid the interference from excessive useless data.

As a preference for the foregoing embodiment, a flexible DC microgrid type judgment system is arranged in the current adjustment big data judgment and adjustment module and sets a corresponding model based on the flexible DC microgrid remote current adjustment and evaluation element of the flexible DC microgrid information sheet, the current adjustment big data judgment and adjustment module performs preliminary current adjustment on the current adjustment and cloud monitoring data set and performs the electrochemical reaction theoretical analysis, and the processed current adjustment and cloud monitoring are introduced into the preset model; and by adjusting the current and the model, the corresponding type of flexible DC microgrid current adjustment and cloud monitoring generate and are delivered to the flexible DC microgrid current adjustment and alarming module through the electrolytic aluminum temperature electrochemical reaction elements, and disaster economic losses and engineer casualties are reduced through a multi-stage flexible DC microgrid alarm.

As a preference for the foregoing embodiment, the flexible DC microgrid current adjustment and cloud monitoring management module includes a flexible DC microgrid monitoring sensor, a flexible DC microgrid current adjustment and cloud monitoring collection module, a flexible DC microgrid module and an electrolytic aluminum temperature electrochemical reaction element current adjustment and cloud monitoring transmission module, different input ends of the flexible DC microgrid monitoring sensor convert the managed current adjustment and cloud monitoring into different electrical signals, different output ends of the flexible DC microgrid monitoring sensor are connected with the flexible DC microgrid current adjustment and cloud monitoring collection module that converts the electrical signals into a plurality of monitoring current adjustment and cloud monitoring, the flexible DC microgrid module collects the plurality of monitoring current adjustment and cloud monitoring and transmits the plurality of monitoring current adjustment and cloud monitoring to the electrolytic aluminum temperature electrochemical reaction element current adjustment and cloud monitoring transmission module that is in transmission interaction with bidirectional current adjustment and cloud monitoring of the electrolytic aluminum temperature electrochemical reaction elements, and transmits the plurality of collected monitoring current adjustment and cloud monitoring to the electrolytic aluminum temperature electrochemical reaction elements.

As a preference for the foregoing embodiment, as shown in FIG. 1, the current adjustment big data judgment and adjustment module, the flexible DC microgrid current adjustment and alarming module and the flexible DC microgrid current adjustment and cloud monitoring management module are in transmission interaction with the bidirectional current adjustment and cloud monitoring of the electrolytic aluminum temperature electrochemical reaction elements in respective, where the current adjustment big data judgment and adjustment module is further configured to receive the electrolytic aluminum temperature optimization and evaluation instructions of the flexible DC microgrid current adjustment and alarming module and sends the electrolytic aluminum temperature optimization and evaluation instructions to the flexible DC microgrid current adjustment and cloud monitoring management module to acquire specific monitoring current adjustment and cloud monitoring; due to an issue of selective management current adjustment and cloud monitoring caused by a great current adjustment and cloud monitoring quantity in a transmission process of the current adjustment and cloud monitoring, a zone prone to the flexible DC microgrid is subjected to detailed electrochemical reaction theoretical analysis in advance in an area and a time period prone to the flexible DC microgrid by actively acquiring a great amount of monitoring current adjustment and cloud monitoring managed by the flexible DC microgrid current adjustment and cloud monitoring management module.

Figure 2:
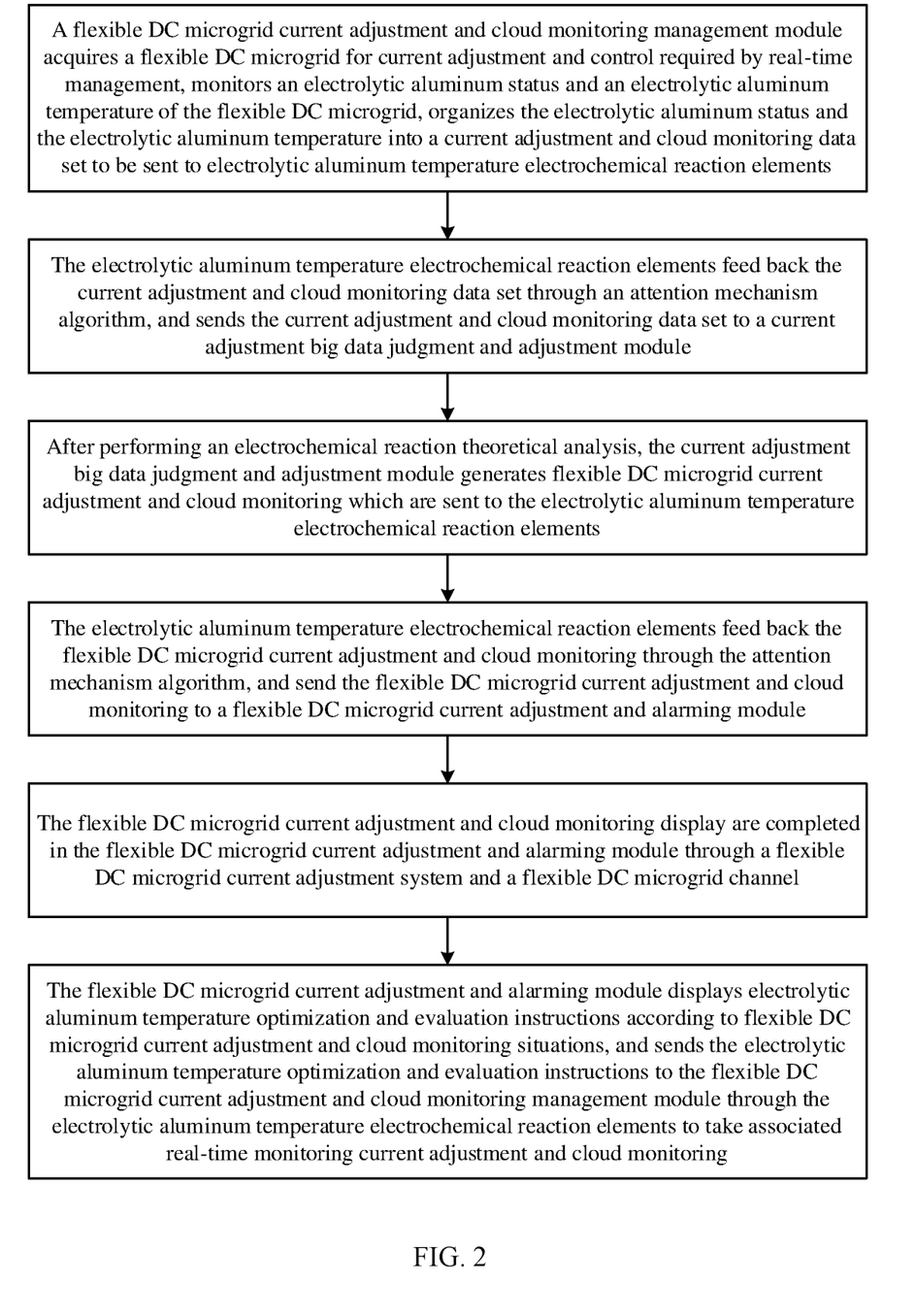
FIG. 2 is an operation flow chart of an electrolytic aluminum system based on a flexible DC microgrid in embodiments of the present disclosure.

In addition, the present disclosure provides an electrolytic aluminum system based on a flexible DC microgrid, as shown in FIG. 2, including the following steps:

the flexible DC microgrid current adjustment and cloud monitoring management module acquires the flexible DC microgrid for current adjustment and control required by real-time management, monitors the electrolytic aluminum status and the electrolytic aluminum temperature of the flexible DC microgrid, organizes the electrolytic aluminum status and the electrolytic aluminum temperature into the current adjustment and cloud monitoring data set to be sent to the electrolytic aluminum temperature electrochemical reaction elements;

the electrolytic aluminum temperature electrochemical reaction elements feed back the current adjustment and cloud monitoring data set through the attention mechanism algorithm, and send the current adjustment and cloud monitoring data set to the current adjustment big data judgment and adjustment module;

after performing the electrochemical reaction theoretical analysis, the current adjustment big data judgment and adjustment module generates the flexible DC microgrid current adjustment and cloud monitoring which are sent to the electrolytic aluminum temperature electrochemical reaction elements; if the temperature is higher, the current efficiency is lower, when the electrolytic temperature rises by 10° C., the current efficiency reduces by 1%, and reducing the electrolytic temperature may improve the current efficiency, but the dissolution for aluminum oxide is reduced. The electrolytic temperature depends on a liquidus temperature of the electrolyte, and to maintain the normal electrolytic production, the electrolytic temperature must be 20-30° C. higher than the liquidus temperature of the electrolyte. To maintain a relatively low electrolyte temperature, the liquidus temperature of the electrolyte must be reduced first, and otherwise the electrolyte supercooling will be caused, resulting in a diseased cell. The main measures for reducing the electrolytic temperature include adopting low molecular ratio electrolyte and adding lithium fluoride (or lithium carbonate), magnesium fluoride and the like to an electrolytic cell;

the flexible DC microgrid type judgment system and the flexible DC microgrid information sheet are established in the current adjustment big data judgment and adjustment module;

the flexible DC microgrid remote current adjustment and evaluation element is stored in the flexible DC microgrid information sheet, the corresponding models are set in the flexible DC microgrid type judgment system, and the models correspond to different types of flexible DC microgrid remote current adjustment and evaluation elements;

the current adjustment big data judgment and adjustment module introduce the current adjustment and cloud monitoring data set for preliminary current adjustment and electrochemical reaction theoretical analysis, and the processed current adjustment and cloud monitoring are introduced into the preset model; and by adjusting the current and the model and judging whether or not the current is abnormal, the corresponding type of flexible DC microgrid current adjustment and cloud monitoring are delivered to the flexible DC microgrid current adjustment and alarming module through the electrolytic aluminum temperature electrochemical reaction elements when the current is abnormal;

the electrolytic aluminum temperature electrochemical reaction elements feed back the flexible DC microgrid current adjustment and cloud monitoring through the attention mechanism algorithm, and send the flexible DC microgrid current adjustment and cloud monitoring to the flexible DC microgrid current adjustment and alarming module;

the flexible DC microgrid current adjustment and cloud monitoring display are completed in the flexible DC microgrid current adjustment and alarming module through the flexible DC microgrid current adjustment system and the flexible DC microgrid channel; and the flexible DC microgrid current adjustment and alarming module includes a multi-stage current adjustment center and an associated engineer APP (Application), which are configured to receive the flexible DC microgrid current adjustment and cloud monitoring displayed by the current adjustment big data judgment and adjustment module, and to display the corresponding electrolytic aluminum temperature optimization and evaluation instructions to the remote electrolytic aluminum temperature optimization and evaluation and current adjustment and cloud monitoring center.

The flexible DC microgrid current adjustment and alarming module displays the electrolytic aluminum temperature optimization and evaluation instructions according to the flexible DC microgrid current adjustment and cloud monitoring situation, and sends the real-time monitoring current adjustment and cloud monitoring associated to the taking of the flexible DC microgrid current adjustment and cloud monitoring management module through the electrolytic aluminum temperature electrochemical reaction elements.

In the present disclosure, by using the current adjustment and cloud monitoring transmission technology for the electrolytic aluminum temperature electrochemical reaction elements, the flexible DC microgrid running monitoring current adjustment and cloud monitoring, flexible DC microgrid monitoring current adjustment and cloud monitoring, engineer operation current adjustment and cloud monitoring, flexible DC microgrid electrolytic aluminum status current adjustment and cloud monitoring and high-precision electrolytic aluminum temperature optimization and cloud monitoring which are acquired by the flexible DC microgrid current adjustment and cloud monitoring management module are transmitted to the current adjustment big data judgment and adjustment module through the electrolytic aluminum temperature electrochemical reaction elements; after performing the electrochemical reaction theoretical analysis, the flexible DC microgrid current adjustment and cloud monitoring generate and are sent to the flexible DC microgrid current adjustment and alarming module through the electrolytic aluminum temperature electrochemical reaction elements, thus implementing the flexible DC microgrid monitoring current adjustment and cloud monitoring transmission as well as the flexible DC microgrid current adjustment and cloud monitoring display, such that the flexible DC microgrid monitored by the flexible DC microgrid is not limited by the current adjustment and cloud monitoring transmission scope, thereby implementing the monitoring for the flexible DC microgrid by different flexible DC microgrids, effectively enhancing the timeliness and reliability that the flexible DC microgrid monitors the flexible DC microgrid, improving the monitoring scientific and technological level of the flexible DC microgrid, and improving the capacity of the flexible DC microgrid.

In the description of the present disclosure, it is also noted that, unless specific regulation and limitation otherwise, terms "set", "install", "join", "connect" and "fix" should be generally understood, for example, may a fixed connection, or a detachable connection, or an integrated connection, may a mechanical connection or an electric connection, may a direct connection or an indirect connection through an intermediation, and may an internal connection of two elements. An ordinary technical engineer in the art may understand the specific meaning of the terms in the present disclosure according to specific conditions.

Although the embodiments of the present disclosure have been presented and described, an ordinary technical engineer in the art may understand that various equivalent changes, modifications, replacements and deformations can be made to these embodiments without deviating from the principle of spirit of the present disclosure, and the scope of the present disclosure is defined by the appended claims and their equivalent scopes.

What is claimed is:

1. An electrolytic aluminum system based on a flexible Direct Current (DC) microgrid, comprising:
   a flexible DC microgrid current adjustment and cloud monitoring management module configured to manage a flexible DC microgrid requiring current adjustment and control in real time and to monitor an electrolytic aluminum status and an electrolytic aluminum temperature of the flexible DC microgrid, wherein the electrolytic aluminum status and the electrolytic aluminum temperature are organized into a current adjustment and cloud monitoring data set to be sent to different flexible DC microgrid electrochemical reaction theoretical analysis modules;
   the different flexible DC microgrid electrochemical reaction theoretical analysis modules provided with different electrolytic aluminum temperature electrochemical reaction elements, among which an attention mechanism algorithm is arranged, wherein the current adjustment and cloud monitoring data set is transmitted to the electrolytic aluminum temperature electrochemical reaction elements and fed back through the attention mechanism algorithm, and then the current adjustment and cloud monitoring data set is sent to a current adjustment big data judgment and adjustment module through the electrolytic aluminum temperature electrochemical reaction elements;
   the current adjustment big data judgment and adjustment module provided with a flexible DC microgrid information sheet, in which a flexible DC microgrid remote current adjustment and evaluation element is arranged, wherein the current adjustment big data judgment and adjustment module performs electrochemical reaction theoretical analysis on the current adjustment and cloud monitoring data set and the flexible DC microgrid remote current adjustment and evaluation element, to obtain different types of flexible DC microgrid current adjustment and cloud monitoring, the flexible DC microgrid current adjustment and cloud monitoring are transmitted to the electrolytic aluminum temperature electrochemical reaction elements, fed back to the electrolytic aluminum temperature electrochemical reaction elements through the attention mechanism algorithm, and delivered to a flexible DC microgrid current adjustment and alarming module; and
   the flexible DC microgrid current adjustment and alarming module comprising a flexible DC microgrid current adjustment system and a flexible DC microgrid channel which are configured to receive the flexible DC microgrid current adjustment and cloud monitoring and to display corresponding electrolytic aluminum temperature optimization and evaluation instructions according to the type of the flexible DC microgrid current adjustment and cloud monitoring, wherein the electrolytic aluminum temperature optimization and evaluation instructions are transmitted to the electrolytic aluminum temperature electrochemical reaction elements through the flexible DC microgrid current adjustment and alarming module, fed back to the electrolytic aluminum temperature electrochemical reaction elements through the attention mechanism algorithm, transmitted to the real-time monitoring current adjustment and cloud monitoring associated to the taking of the flexible DC microgrid current adjustment and cloud monitoring management module by the electrolytic aluminum temperature electrochemical reaction elements, and completes the flexible DC microgrid current adjustment and cloud monitoring display through the flexible DC microgrid current adjustment system.

2. The electrolytic aluminum system based on the flexible DC microgrid according to claim 1, wherein a flexible DC microgrid type judgment system is arranged in the current adjustment big data judgment and adjustment module and sets a corresponding model based on the flexible DC microgrid remote current adjustment and evaluation element of the flexible DC microgrid information sheet, the current adjustment big data judgment and adjustment module performs preliminary current adjustment on the current adjustment and cloud monitoring data set and performs the electrochemical reaction theoretical analysis, and the processed current adjustment and cloud monitoring are introduced into the preset model; and by adjusting the current and the model, the corresponding type of flexible DC microgrid current adjustment and cloud monitoring generate and are delivered to the flexible DC microgrid current adjustment and alarming module through the electrolytic aluminum temperature electrochemical reaction elements.

3. The electrolytic aluminum system based on the flexible DC microgrid according to claim 1, wherein the flexible DC microgrid current adjustment and cloud monitoring management module comprises a flexible DC microgrid monitoring sensor, a flexible DC microgrid current adjustment and cloud monitoring collection module, a flexible DC microgrid module and an electrolytic aluminum temperature electrochemical reaction element current adjustment and cloud monitoring transmission module, different input ends of the flexible DC microgrid monitoring sensor convert the managed current adjustment and cloud monitoring into different electrical signals, different output ends of the flexible DC microgrid monitoring sensor are connected with the flexible DC microgrid current adjustment and cloud monitoring collection module that converts the electrical signals into a plurality of monitoring current adjustment and cloud monitoring, the flexible DC microgrid module collects the plurality of monitoring current adjustment and cloud monitoring and transmits the plurality of monitoring current adjustment and cloud monitoring to the electrolytic aluminum temperature electrochemical reaction element current adjustment and cloud monitoring transmission module that is in transmission interaction with bidirectional current adjustment and cloud monitoring of the electrolytic aluminum temperature electrochemical reaction elements, and transmits the plurality of collected monitoring current adjustment and cloud monitoring to the electrolytic aluminum temperature electrochemical reaction elements.

4. The electrolytic aluminum system based on the flexible DC microgrid according to claim 1, wherein the current adjustment big data judgment and adjustment module, the flexible DC microgrid current adjustment and alarming module and the flexible DC microgrid current adjustment and cloud monitoring management module are in transmission interaction with the bidirectional current adjustment and cloud monitoring of the electrolytic aluminum temperature electrochemical reaction elements in respective, the current adjustment big data judgment and adjustment module is further configured to receive the electrolytic aluminum temperature optimization and evaluation instructions of the flexible DC microgrid current adjustment and alarming module and sends the electrolytic aluminum temperature optimization and evaluation instructions to the flexible DC microgrid current adjustment and cloud monitoring management module to acquire specific monitoring current adjustment and cloud monitoring.

5. The electrolytic aluminum system based on the flexible DC microgrid according to claim 1, wherein the remote current adjustment for the system comprises the following steps:
- the flexible DC microgrid current adjustment and cloud monitoring management module acquires the flexible DC microgrid for current adjustment and control required by real-time management, monitors the electrolytic aluminum status and the electrolytic aluminum temperature of the flexible DC microgrid, organizes the electrolytic aluminum status and the electrolytic aluminum temperature into the current adjustment and cloud monitoring data set to be sent to the electrolytic aluminum temperature electrochemical reaction elements;
- the electrolytic aluminum temperature electrochemical reaction elements feed back the current adjustment and cloud monitoring data set through the attention mechanism algorithm, and send the current adjustment and cloud monitoring data set to the current adjustment big data judgment and adjustment module;
- after performing the electrochemical reaction theoretical analysis, the current adjustment big data judgment and adjustment module generates the flexible DC microgrid current adjustment and cloud monitoring which are sent to the electrolytic aluminum temperature electrochemical reaction elements;
- the electrolytic aluminum temperature electrochemical reaction elements feed back the flexible DC microgrid current adjustment and cloud monitoring through the attention mechanism algorithm, and send the flexible DC microgrid current adjustment and cloud monitoring to the flexible DC microgrid current adjustment and alarming module;
- the flexible DC microgrid current adjustment and cloud monitoring display are completed in the flexible DC microgrid current adjustment and alarming module through the flexible DC microgrid current adjustment system and the flexible DC microgrid channel; and
- the flexible DC microgrid current adjustment and alarming module displays the electrolytic aluminum temperature optimization and evaluation instructions according to the flexible DC microgrid current adjustment and cloud monitoring situation, and sends the electrolytic aluminum temperature optimization and evaluation instructions to the flexible DC microgrid current adjustment and cloud monitoring management module through the electrolytic aluminum temperature electrochemical reaction elements to take the associated real-time monitoring current adjustment and cloud monitoring.

* * * * *